(12) United States Patent
Pallini et al.

(10) Patent No.: US 10,274,013 B2
(45) Date of Patent: Apr. 30, 2019

(54) CAM FOLLOWER WITH TIRE HAVING AXIAL MOVEMENT COMPENSATING FEATURES

(71) Applicant: Roller Bearing Company of America, Inc., Oxford, CT (US)

(72) Inventors: Robert A. Pallini, Cheltenham, PA (US); Bradley T. Smith, Glastonbury, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 314 days.

(21) Appl. No.: 15/046,158

(22) Filed: Feb. 17, 2016

(65) Prior Publication Data

US 2016/0160922 A1   Jun. 9, 2016

Related U.S. Application Data

(63) Continuation-in-part of application No. 14/577,126, filed on Dec. 19, 2014, now abandoned, which is a
(Continued)

(51) Int. Cl.
*F16C 33/58*   (2006.01)
*F16C 19/54*   (2006.01)
(Continued)

(52) U.S. Cl.
CPC .......... *F16C 33/586* (2013.01); *F16C 13/006* (2013.01); *F16C 35/067* (2013.01);
(Continued)

(58) Field of Classification Search
CPC ...... F16C 33/586; F16C 19/54; F16C 33/783; F16C 33/7823; F16C 33/667; F16C 19/28; F16H 53/06
See application file for complete search history.

(56) References Cited

U.S. PATENT DOCUMENTS

| 860,639 A | 7/1907 | Crago |
| 3,741,615 A * | 6/1973 | Otto ................... F16C 33/7813 |
| | | 277/551 |

(Continued)

FOREIGN PATENT DOCUMENTS

| EP | 1106850 A1 | 6/2001 |
| EP | 2541083 A2 | 1/2013 |

(Continued)

OTHER PUBLICATIONS

Define junction—Google Search, google.com., Sep. 17, 2018. (Year: 2018).*

(Continued)

*Primary Examiner* — Vinh Luong

(74) *Attorney, Agent, or Firm* — Murtha Cullina LLP

(57) ABSTRACT

A bearing assembly for a cam follower assembly for a ram assembly for a metal can production necker includes two or more bearings. Each of the bearing includes an inner ring positioned within an outer ring and a plurality of rolling elements positioned therebetween. The bearing assembly includes a tire press fit on the outer rings of the bearings. The tire has an elongate body portion that extends between a first radially inward projecting shoulder and a second radially inward projecting shoulder. A radially inward facing surface extends between the first radially inward projecting shoulder and the second radially inward projecting shoulder. The first radially inward projecting shoulder extends further radially inward than the second radially inward projecting shoulder.

10 Claims, 9 Drawing Sheets

Related U.S. Application Data continuation-in-part of application No. 13/678,031, filed on Nov. 15, 2012, now abandoned.

(60) Provisional application No. 61/560,593, filed on Nov. 16, 2011.

(51) Int. Cl.
| | | |
|---|---|---|
| *F16C 13/00* | (2006.01) | |
| *F16H 53/06* | (2006.01) | |
| *F16C 35/067* | (2006.01) | |
| *F16C 19/06* | (2006.01) | |
| *F16C 19/28* | (2006.01) | |

(52) U.S. Cl.
CPC .............. *F16H 53/06* (2013.01); *F16C 19/06* (2013.01); *F16C 19/28* (2013.01); *F16C 19/54* (2013.01); *F16C 2226/12* (2013.01); *F16C 2226/50* (2013.01); *F16C 2240/42* (2013.01); *Y10T 74/2107* (2015.01)

(56) References Cited

U.S. PATENT DOCUMENTS

| | | | |
|---|---|---|---|
| 4,025,132 A | 5/1977 | Watanabe | |
| 4,602,875 A | 7/1986 | Doerr et al. | |
| 4,817,995 A * | 4/1989 | Deubler | F16L 27/0828 |
| | | | 285/14 |
| 5,001,435 A * | 3/1991 | Smith | F16C 19/52 |
| | | | 324/671 |
| 5,414,784 A | 5/1995 | Schulte et al. | |
| 5,433,098 A | 7/1995 | Bowlin et al. | |
| 5,517,957 A * | 5/1996 | Wagner | F02B 67/06 |
| | | | 123/192.1 |
| 5,531,137 A | 7/1996 | Guilford | |
| 6,007,253 A * | 12/1999 | Rutter | F16C 19/184 |
| | | | 384/539 |
| 6,164,109 A | 12/2000 | Bartosch | |
| 7,263,867 B2 | 9/2007 | Bartosch | |
| 2001/0053257 A1 | 12/2001 | Takatsu | |
| 2007/0085239 A1 | 4/2007 | Nomura et al. | |
| 2007/0144304 A1 | 6/2007 | El Hachem et al. | |
| 2008/0011119 A1 | 1/2008 | Bartosch | |
| 2012/0111141 A1 | 5/2012 | Shibutani et al. | |
| 2015/0091368 A1* | 4/2015 | Morello | B60B 7/0013 |
| | | | 301/108.3 |
| 2015/0101387 A1 | 4/2015 | Pallini | |
| 2015/0156954 A1* | 6/2015 | Ciulla | B60B 27/0005 |
| | | | 384/460 |
| 2015/0300463 A1* | 10/2015 | Albrecht | F16C 33/58 |
| | | | 474/166 |
| 2017/0036409 A1* | 2/2017 | Capoldi | F16C 35/061 |
| 2018/0149257 A1* | 5/2018 | Prescavage | F16C 33/7853 |

FOREIGN PATENT DOCUMENTS

| | | | | |
|---|---|---|---|---|
| GB | 126952 | * | 9/1919 | ............ A01B 71/04 |
| JP | 60201162 A | | 10/1985 | |
| JP | 2004-162874 | * | 6/2004 | ............ F16C 33/58 |
| JP | 2007-32586 | * | 8/2007 | |
| JP | 2008057568 A | | 3/2008 | |
| WO | WO 2013/159840 A1 | * | 10/2013 | |

OTHER PUBLICATIONS

International Search Report and Written Opinion issued in corresponding PCT Application No. PCT/US2012/065260 dated Feb. 1, 2013.

European Search Report for corresponding EP17156433 dated Jul. 4, 2017.

* cited by examiner

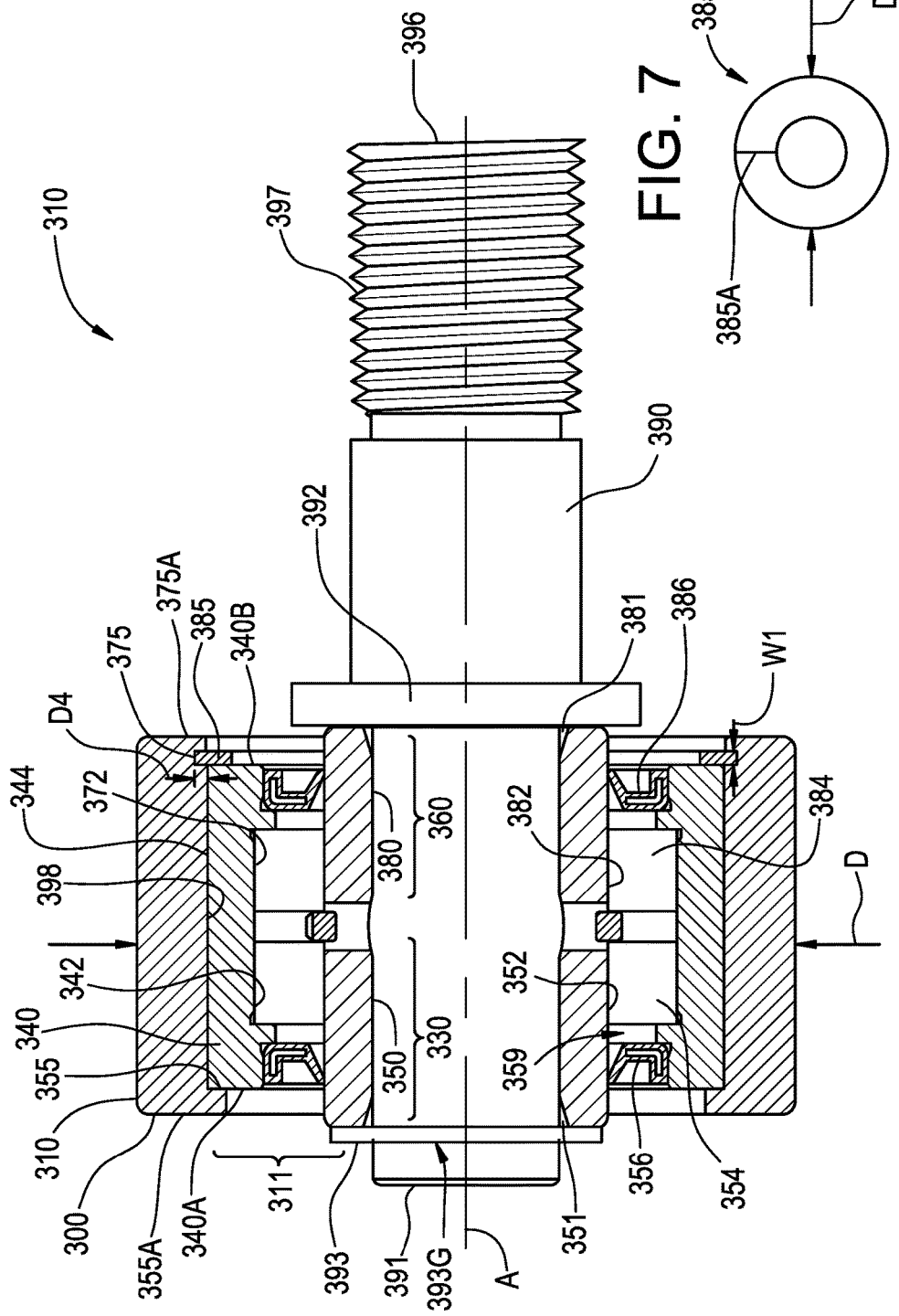

CAM FOLLOWER WITH TIRE HAVING AXIAL MOVEMENT COMPENSATING FEATURES

CROSS REFERENCE TO RELATED APPLICATIONS

This application is a continuation in part of copending U.S. patent application Ser. No. 14/577,126, entitled "Cam Follower for a Ram of a Necker Machine and a Method for Manufacturing the Same," filed Dec. 19, 2014 which is a continuation in part of copending U.S. patent application Ser. No. 13/678,031 entitled "Cam Follower for a Ram of a Necker Machine and a Method for Manufacturing the Same," filed Nov. 15, 2012 which claims the benefit of U.S. Provisional Patent Application No. 61/560,593 titled "Bearing for Moldably Attaching to a Device" filed on Nov. 16, 2011, the contents of all three applications being incorporated herein by reference in their entireties.

FIELD OF THE INVENTION

The present invention is generally directed to a cam follower for a ram of a metal can production necker. More specifically, the present invention is directed to cam follower having a composite tire having axial movement mitigation features.

BACKGROUND OF THE INVENTION

Metal cans are often produced as two piece cans which comprise a cylindrical can body with an integral bottom wall and a can top. The can is typically made from aluminum. Typically, curved sections are formed at the bottom and top of the can to increase its structural integrity. A can making machine, sometimes referred to as a necker, forms the curved sections of the can by progressively squeezing, i.e. necking, the can body between opposing ram bodies which squeeze the can. The ram typically includes one or more cam followers extending therefrom. The cam followers ride on a cam that is mounted on a cylinder. As the ram rotates about the cylinder, the cam follower rides on the cam, which is configured to move the ram back and forth.

Typically, the cam is inserted into a tire to enhance operation thereof. The tire facilitates a smooth transition of force between the cam and the remaining portion of the cam follower. Moreover, the tire inhibits wear of the cam, the remaining portion of the cam follower, the ram, and, more generally, the necker machine. A disadvantage of known cam followers for rams of necker machines is that over time and with extended use, the tire tends to shift axially relative to the remaining portion of the cam follower, and more specifically the outer ring. If this problem is not corrected, it can lead to reduced performance of the necker machine, and can further require unscheduled or more frequent maintenance or repair.

Cam followers can include two bearings (e.g., roller or ball bearings) mounted adjacent to one another on a stud. The bearings have a predetermined first axial width and a first manufacturing tolerance of plus or minus a fraction of the first axial width. When two of the bearings are assembled on the stud adjacent to one another the combined axial width of the two bearings has a "stack-up" tolerance that depends on the individual tolerances (e.g., first manufacturing tolerances) of each of the bearings. The two bearings are typically installed between two radially inward projecting shoulders of the tire in which outer rings of the bearings are disposed. The tire has a second axial width defined between the shoulders. The second axial width has a second manufacturing tolerance of plus or minus a fraction of the second axial width. Thus, when the first manufacturing tolerance of the bearings is on the low end and the second axial tolerance of the tire is on the high end, the combined axial width of the two bearings could be less than the second axial width between the shoulders. This creates an axial gap between an axial inward portion of the shoulder and the adjacent bearing. This axial gap allows the tire to move axially on the bearings. Such axial movement of the tire relative to the bearings could cause premature failure of the cam follower.

Thus, there exists a need to accommodate such manufacturing tolerances and to provide a cam follower in which axial movement of the tire relative to the bearings is reduced or eliminated.

SUMMARY OF THE INVENTION

The present invention resides in one aspect in a cam follower for a ram of a metal can production necker. The cam follower comprises an outer ring having an outer ring bearing surface and an exterior surface. The exterior surface defines a groove extending along at least a portion thereof. The cam follower includes an inner ring coaxially disposed at least partially in the outer ring and having an inner ring bearing surface. A plurality of rolling elements is disposed in an annular cavity between the outer ring bearing surface and the inner ring bearing surface. The plurality of rolling elements are in rolling engagement with the outer ring bearing surface and the inner ring bearing surface so that the outer ring is rotatable relative to the inner ring about an axis of rotation. A shaft is received in a bore in the inner ring and is fixed relative thereto about the axis of rotation. The outer ring is received in a tire. A least a portion of the tire is disposed in the groove to inhibit axial movement of the tire relative to the outer ring.

In some embodiments of the present invention, the groove extends around a circumference of the outer ring. In yet further embodiments of the present invention, the groove extends in a plane substantially perpendicular to the axis of rotation. In yet further embodiments of the present invention, the exterior surface of the outer ring defines a plurality of grooves extending along at least a portion thereof.

In some embodiments of the present invention, the tire is molded about the outer ring. In yet other embodiments of the present invention, the tire comprises nylon. In yet further embodiments of the present invention, an outside surface of the tire is crowned.

In one embodiment of the present invention, the outer ring comprises a first section defining a first outer raceway and a second section defining a second outer raceway. The inner ring comprises a first section defining a first inner raceway and a second section defining a second inner raceway. A first plurality of rolling elements is disposed between the first outer raceway and the first inner raceway. A second plurality of rolling elements is disposed between the second outer raceway and the second inner raceway. In yet further embodiments of the present invention, the first plurality of rolling elements and the second plurality of rolling elements comprise balls.

The present invention resides in another aspect in a method of manufacturing a cam follower for a ram of a metal can production necker. The method includes the step of providing a bearing having an outer ring having an outer ring bearing surface and an exterior surface. An inner ring is coaxially disposed at least partially in the outer ring and has an inner ring bearing surface. A plurality of rolling elements is disposed between the outer ring bearing surface and the inner ring bearing surface. The plurality of rolling elements are in rolling engagement with the outer ring bearing surface and the inner ring bearing surface so that the outer ring is rotatable relative to the inner ring about an axis of rotation. The method further includes the step of disposing the bearing in a mold. A molding material is injected into the mold and the mold is cured to form a tire about exterior surface of the outer ring.

In some embodiments of the inventive method, the exterior surface of the outer ring defines a groove extending along at least a portion thereof and at least a portion of the tire is disposed in the groove to inhibit axial movement of the tire relative to the outer ring. In yet further embodiments of the present invention, the groove extends about a circumference of the outer ring. In yet further embodiments of the inventive method, the groove extends in a plane substantially perpendicular to the axis of rotation. In yet further embodiments of the present invention, the exterior surface of the outer ring defines a plurality of grooves extending along at least a portion thereof.

In some embodiments of the present invention, the exterior surface of the outer ring defines a protuberance extending along at least a portion thereof. The protuberance interfaces with the tire to inhibit axial movement of the tire relative to the outer ring. In some embodiments of the present invention, the protuberance extends about a circumference of the outer ring.

In some embodiments of the present invention, the protuberance extends in a plane substantially perpendicular to the axis of rotation. In yet further embodiments, the exterior surface of the outer ring defines a plurality of protuberances extending along at least a portion thereof. In some embodiments of the present invention, the molding material comprises nylon. In yet further embodiments of the present invention, an outside surface of the tire is crowned.

There is disclosed herein a cam follower for a ram assembly. The cam follower includes an outer ring having an outer ring bearing surface and an exterior surface; and an inner ring coaxially disposed at least partially in the outer ring and having an inner ring bearing surface. A plurality of rolling elements is disposed in an annular cavity between the outer ring bearing surface and the inner ring bearing surface. The rolling elements are in rolling engagement with the outer ring bearing surface and the inner ring bearing surface so that the outer ring is rotatable relative to the inner ring about an axis of rotation. A shaft is received in a bore in the inner ring and is fixed relative thereto about the axis of rotation. A tire extends around the exterior surface. The tire is manufactured from a composite material. In one embodiment, the tire is manufactured from an acetal homopolymer. In one embodiment, the composite material is an acetal homopolymer.

There is disclosed herein a ram assembly of a metal can production necker. The ram assembly includes a bushing having a bore extending therethrough. The ram assembly includes a ram piston positioned in the bore. One or more cam followers are positioned on the ram piston. The cam followers include an outer ring having an outer ring bearing surface and an exterior surface; and an inner ring coaxially disposed at least partially in the outer ring and having an inner ring bearing surface. A plurality of rolling elements are disposed in an annular cavity between the outer ring bearing surface and the inner ring bearing surface. The plurality of rolling elements are in rolling engagement with the outer ring bearing surface and the inner ring bearing surface so that the outer ring is rotatable relative to the inner ring about an axis of rotation. A shaft is received in a bore in the inner ring and is fixed relative thereto about the axis of rotation. A tire extends around the exterior surface. The tire is manufactured from a composite material. In one embodiment, the tire is manufactured from an acetal homopolymer. In one embodiment, the composite material is an acetal homopolymer.

There is also disclosed herein a method of manufacturing a cam follower. The method includes providing an outer ring that defines an exterior surface and has an outside diameter. A tire manufactured from a composite material and having an inside diameter less than the outside diameter is provided. The tire is heated to a predetermined temperature suitable to increase the inside diameter to a magnitude greater than the outside diameter. The tire is fitted around the outer ring. The tire is cooled to create an interference fit between the tire and the outer ring.

In one embodiment, the exterior surface is roughened (e.g., sandblasted) to a predetermined roughness before the tire is fitted around the outer ring.

In one embodiment, an outside surface of the tire is machined to be concentric with the outer ring.

In one embodiment, a groove extends radially outward into the tire and a locking device (e.g., a retaining ring or snap ring) is fit into the groove to axially secure the tire to the outer ring.

There is also disclosed herein a bearing assembly for a cam follower assembly for a ram assembly for a metal can production necker that includes two or more roller or ball bearings. Each of the roller or ball bearing includes an inner ring positioned within an outer ring and a plurality of rolling elements positioned therebetween. The bearing assembly includes a tire press fit on the outer rings of the roller or ball bearings. The tire has an elongate body portion that extends between a first radially inward projecting shoulder and a second radially inward projecting shoulder. A radially inward facing surface extends between the first radially inward projecting shoulder and the second radially inward projecting shoulder. The first radially inward projecting shoulder extends further radially inward than the second radially inward projecting shoulder.

In one embodiment, the second radially inward projecting shoulder has an inwardly facing sloped abutment surface.

In one embodiment, the outer rings of the roller or ball bearings are axially compressed between the first radially inward projecting shoulder and the second radially inward projecting shoulder.

DESCRIPTION OF THE DRAWINGS

FIG. 5 is cross sectional view of a cam follower in accordance with another embodiment of the present invention;

FIG. 7 is a front view of a spilt ring embodiment of a retaining ring;

DETAILED DESCRIPTION OF THE INVENTION

Figure 1:
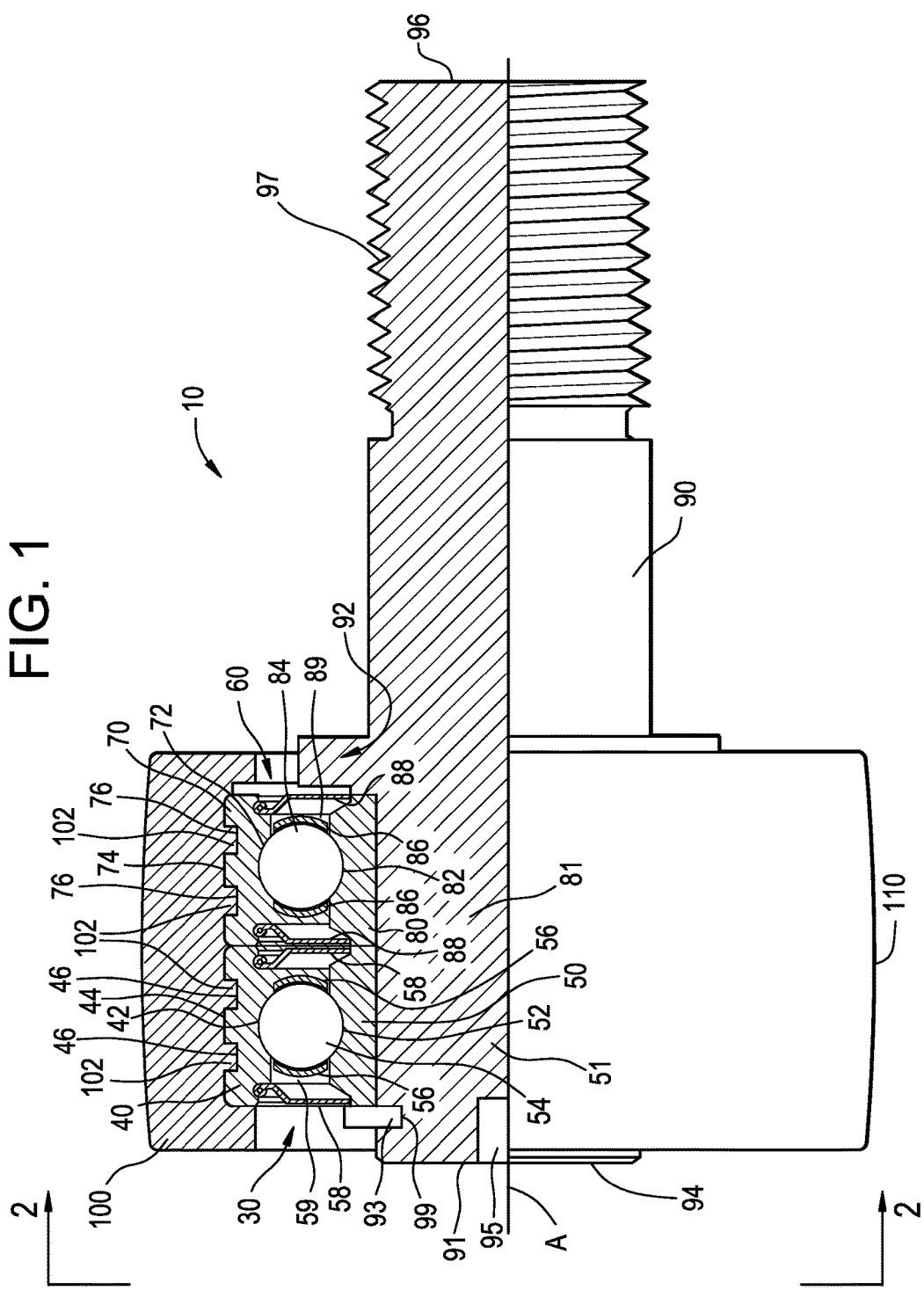
FIG. 1 is partial cross sectional view of a cam follower in accordance with one embodiment of the present invention.
Figure 2:
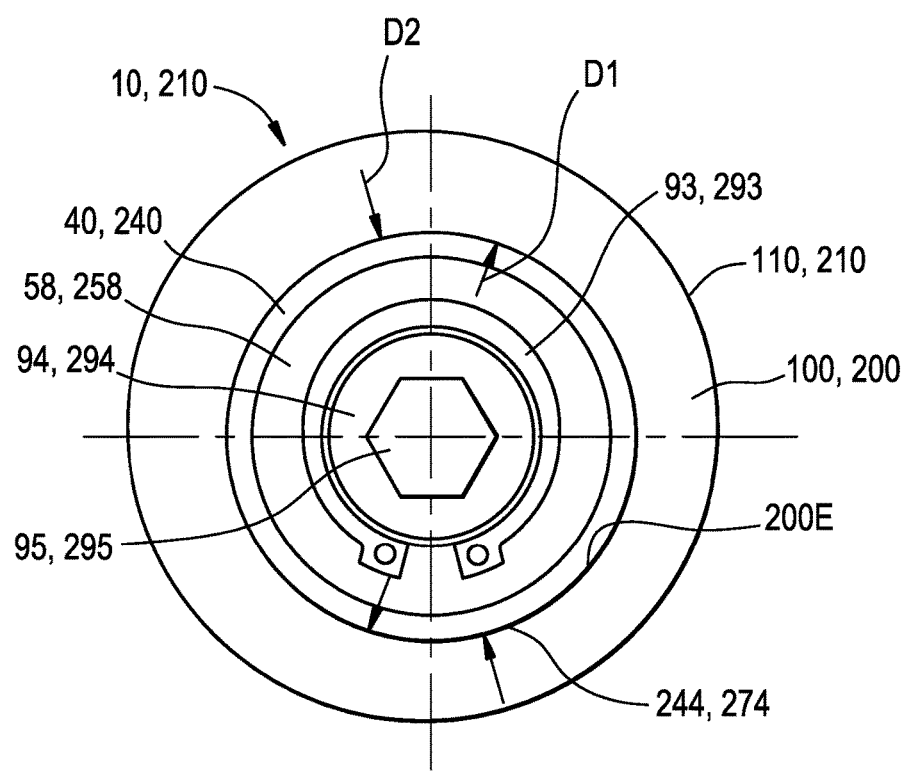
FIG. 2 is an end view of the cam followers shown in FIG. 1 and taken across line 2-2.

As shown in FIGS. 1-2, a cam follower for a ram of a necker machine is shown and is generally designated by the reference numeral 10. The cam follower 10 includes a first bearing 30 (e.g., a roller or ball bearing) and a second bearing 60 (e.g., a roller or ball bearing). The first bearing 30 and the second bearing 60 are configured in a tandem configuration; that is, they are side to side. In the embodiment shown, the first bearing 30 and the second bearing 60 abut each other and are coaxial about a first axis of rotation A.

The first bearing 30 comprises a first outer ring 40 having a first outer race 42, also referred to as a bearing surface, and a first exterior surface 44. The first bearing 30 further includes a first inner ring 50 having a first inner race 52, also referred to as a bearing surface. The first inner ring 50 is coaxially disposed in the first outer ring 40. A plurality of balls 54 are disposed between the first outer race 42 and the first inner race 52. The plurality of balls 54 are in rolling engagement with the first outer race 42 and the first inner race 52 so that the first outer ring 40 is rotatable relative to the first inner ring 50 about the first axis of rotation A.

The first bearing 30 comprises an interior set of seals 56 extending radially between the first outer ring 42 and the first inner ring 52 on either side of the first plurality of balls 54. The first bearing 30 further comprises an exterior set of seals 58 extending radially between the first outer ring 40 and the first inner ring 50 axially outside of the interior set of seals 56. The interior and exterior seals 56, 58 are configured to retain a lubricant inside an annular cavity 59 formed between the first outer race 42 and the first inner race 52 in which the first plurality of balls 54 is disposed. In the embodiment shown, the seals 56, 58 comprise a low carbon steel, however, as can be appreciated by a person having ordinary skill in the art and familiar with this disclosure, the seals 56, 58, also referred to a shields, can comprise many different materials.

In the embodiment disclosed in FIG. 1, the second bearing 60 is similar in configuration to the first bearing 30. The second bearing 60 comprises a second outer ring 70 having a second outer race 72, also referred to as a bearing surface, and a second exterior surface 74. The second bearing 70 further includes a second inner ring 80 having a second inner race 82, also referred to as a bearing surface. The second inner ring 80 is coaxially disposed in the second outer ring 70. A second plurality of balls 84 are disposed between the second outer race 72 and the second inner race 82. The plurality of balls 84 are in rolling engagement with the second outer race 72 and the second inner race 82 so that the second outer ring 70 is rotatable relative to the second inner ring 80 about the first axis of rotation A.

The second ball bearing 60 comprises an interior set of seals 86 extending radially between the second outer ring 72 and the second inner ring 82 on either side of the second plurality of balls 84. The second bearing 60 further comprises an exterior set of seals 68 extending radially between the second outer ring 72 and the second inner ring 82 axially outside of the interior set of seals 86. The seals 86, 88 are configured to retain a lubricant inside an annular cavity 89 formed between the second outer race 72 and the second inner race 82 in which the second plurality of balls 84 are disposed. In the embodiment shown, the seals comprise a low carbon steel, however, as can be appreciated by a person having ordinary skill in the art and being familiar with this disclosure, the seals 86, 88, also referred to a shields, can comprise many different materials.

In reference to the embodiment shown in FIGS. 1-2, although the cam follower 10 comprises a first bearing 30 (e.g., a roller or ball bearing) and a second bearing 60 (e.g., a roller or ball bearing), the present invention is not limited in this regard and, as will be appreciated by a person of ordinary skill in the art, many different configurations may be employed. For example, the present invention may be practiced using a cam follower having a single row of ball or roller bearings. Or, for example, the present invention may be practiced using a cam follower having a roller or ball bearing wherein a single continuous outer ring defines a first outer race and a second outer race, and a single continuous inner ring defines a first inner raceway and a second inner raceway.

In the embodiment shown in FIGS. 1-2, the outer rings 40, 70 and the inner rings 50, 80 comprise 52100 steel that is through hardened. The first plurality of balls 54 and the second plurality of balls 84 also comprise 52100 steel. In the embodiment shown, the balls 54, 84 are separated by a cage, as is commonly known in the art (not shown in the FIG.). The cage comprises low carbon soft steel. It should be understood that the present invention is not limited to a cage, since different spacers, or no spacers, may be employed between the balls in the first plurality of balls 54 and the second plurality of balls 84. It should also be understood that the present invention is not limited to balls, since other types of rolling elements may be employed with the present invention, for example, needle rollers. Although specific materials are disclosed herein, a person of ordinary skill in the art and familiar with this disclosure will understand that the present invention is not limited in this regard, and that other materials may be used with the present invention.

In reference to FIGS. 1-2, the first inner ring 50 comprises a first bore 51 extending therethrough, and the second inner ring 80 comprises a second bore 81 extending therethrough. A shaft 90 is received through the first bore 51 and the second bore 81. In the embodiment shown in FIGS. 1-2, the shaft 90 is press-fit in the first bore 51 and the second bore 81 so that the first inner ring 50 and the second inner ring 80 are fixed relative to the shaft about the first axis of rotation A. The shaft 90, also referred to as a stud, extends between a first end 91 and a second end 96. The first bearing 30 and the second bearing 60 are received on the shaft 90 proximate to the first end 91 thereof. The shaft comprises a shoulder 92 projecting radially from the shaft between the first end 91 and the second end 96. After the second bearing 60 is received on the shaft 90 the second inner ring 80 abuts the shoulder 92 to inhibit axial movement of the bearings 30, 60 relative to the shaft 90. After the bearings 30, 60 are disposed on the shaft 90 and the second inner ring abuts the shoulder 92, a retainer ring 93 is fixedly received in a groove 99 on the shaft 90 proximate to the first end 91 so the first bearing 30 and the second bearing 60 are disposed axially between the retainer ring 93 and the shoulder 92 to thereby inhibit axial movement of the bearings relative to the shaft.

The shaft 90 includes a face 94 at the first end 91 perpendicular to the first axis of rotation A. The face 94 comprises a recessed hexagonal socket 95 configured to receive a hex wrench (or the like) for rotating the shaft 90 about the first axis of rotation A. The shaft 90 further includes a plurality of threads 97 on a radial outside surface of the shaft 90. In this way, the shaft 90 can be received in a bore (not shown in the FIGS. 1-2) comprising a complementary thread pattern, or can similarly be received in a nut or the like having a complementary thread pattern.

The first bearing 30 and the second bearing 60 are received in a tire 100. The tire 100 has an outside surface 110. The outside surface 110 engages the cam (not shown in FIGS. 1-2) during operating of the necker in accordance with the present invention. The first exterior surface 44 and the second exterior surface 74 each have a plurality of grooves 46, 76 extending along a circumference of the outer rings 40, 70 in a plane perpendicular to the first axis of rotation A. In the embodiment shown, each outer ring 40, 70 includes two grooves 46, 76 in its exterior surface 44, 74. It should be understood, however, that the present invention is not limited in this regard, and that different configurations may be employed with the present invention. For example, each exterior surface 44, 74 may have more than two grooves 46, 76, or the first exterior surface 44 may have a single groove 46, while the second exterior surface 74 does not include any grooves. In the embodiment shown, the grooves 46, 76 are machined into the exterior surfaces 44, 74.

A portion 102 of the tire 100 is disposed in each groove 46, 76. This interface between the portion 102 of the tire 100 and the grooves 46, 76 inhibits axial movement of the tire 100 relative the bearings 30, 60 thereby improving the performance of the cam follower 10 in accordance with the present invention.

It should be understood that while the interface between the tire 100 and the exterior surfaces 44, 74 is defined as the exterior surfaces having grooves 46, 76 in which a portion 102 of the tire 100 is disposed therein to inhibit axial movement of the tire 100 relative to the bearings 30, 60, the present invention is not limited in this regard. For example, the exterior surfaces 44, 74 may comprise one of more circumferential protuberances. In a similar fashion, portions of the tire surround the protuberances, thereby inhibiting axial movement of the tire relative to the bearings 30, 60.

In the disclosed embodiments, the tire 100 is molded onto the bearings 30, 60. The balls bearings 30, 60 are disposed in a mold configured to form a tire 100 about the first and second outer rings 40, 70. A molding material is injected into the mold and is then cured about the outer rings 40, 70 to form the tire 100. In the embodiment shown, the mold material is molten nylon, although, it should be understood that many different molding materials may be used with the present invention. During the molding process, the molding material solidifies in the grooves 46, 76, so that the portion 102 of the tire 100 is disposed in the grooves 46, 76. In this manner, the interface of the grooves 46, 76 and the portion 102 of the tire 100 disposed therein inhibits axial movement of the tire relative to the bearings 30, 60. In the embodiment shown, the outside surface 110 of the tire 100 is crowned to facilitate the rolling of the cam follower 10 relative to the cam (not shown) during operation of the necker in accordance with the present invention.

Figure 3:
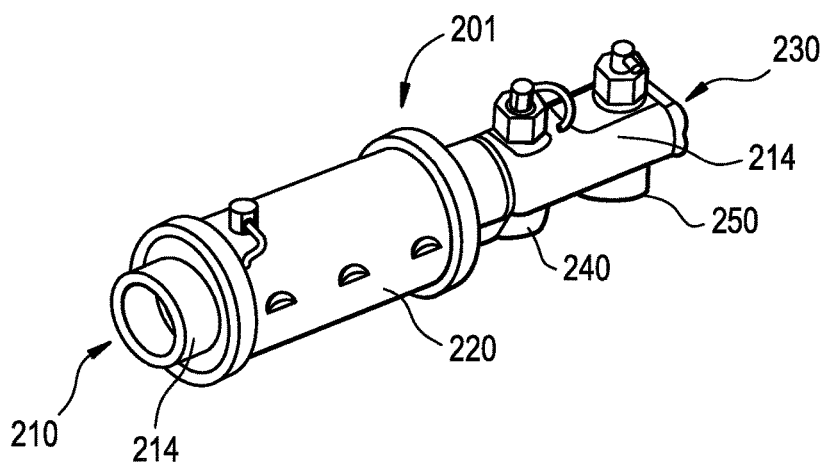
FIG. 3 is a perspective view of a ram in accordance with one embodiment of the present invention in which to cam followers are coupled thereto.
Figure 4:
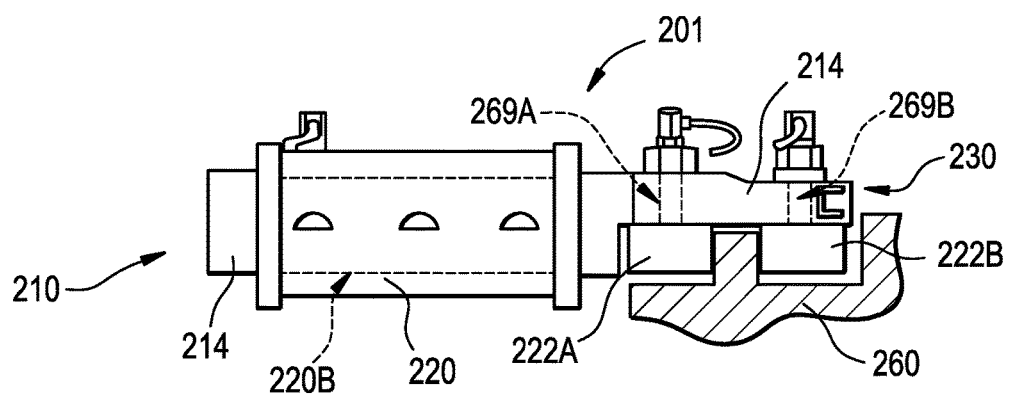
FIG. 4 is a front view of the ram shown in FIG. 3.

In reference to FIGS. 3 and 4 a ram assembly 201 for a necker machine (not shown) in accordance with the present invention is shown. In such a can making necker machine, a cam follower usually rides on a stationary cam with the rotational axis parallel to the cam's surface. The ram assembly 201 extends between a first end 210 and a second end 230. The ram assembly 201 includes a fixed bushing 220 having a bore 220B extending therethrough between the first end 210 and the second end 230. A ram piston 214 extends through either end of the bore 220B of the fixed bushing 220. Proximate to the second end of the ram 230, two cam followers 222A, 222B (similar to the cam follower 10 illustrated in FIGS. 1-2 and the cam follower 210 illustrated in FIGS. 9-11 and described in detail herein) extend through bores 269 A and 269B and extend radially therefrom. The cam followers 222A, 222B ride on a surface of a cam 260, one 222A, 222B on each side of the cam 260, at the same time they are rotating around the cam's axis. The ram 214 is moved back and forth by the attached cam followers 222A, 222B in an accelerating and decelerating movement following a profile of the cam 260. Considerable radial force is developed on the cam follower 222A, 222B during the can necking operation.

As shown in FIG. 5, a cam follower 310 is similar to the cam follower 10 of FIGS. 1 and 2. Therefore, similar elements are assigned similar reference numbers preceded by the numeral 3. The cam follower 310 includes a double row bearing 311 having a first bearing section 330 and a second bearing section 360. The first bearing section 330 and the second bearing section 360 are configured in a tandem configuration; that is, they are axially side to side. In the embodiment shown, the first bearing section 330 and the second bearing section 360 are axially fixed relative to each other about a first axis of rotation A.

The first bearing section 330 and the second bearing section 360 share a common outer ring 340 having a first outer race 342 and a second outer race 372, each also referred to as a bearing surface. The common outer ring 340 has an exterior surface 344. The first bearing section 330 further includes a first inner ring 350 having a first inner race 352, also referred to as a bearing surface. The first inner ring 350 is coaxially disposed in the common outer ring 340. A plurality of rolling elements 354 (e.g., needle rollers or balls) are disposed between the first outer race 342 and the first inner race 352. The plurality of rolling elements 354 are in rolling engagement with the first outer race 342 and the first inner race 352 so that the common outer ring 340 is rotatable relative to the first inner ring 350 about the first axis of rotation A.

The first bearing section 330 has an annular seal 356 extending radially between the first common outer ring 342 and the first inner ring 350. The seal 356 is configured to retain a lubricant inside an annular cavity 359 formed between the common outer ring 340 and the first inner ring 350 in which the first plurality of rolling elements 354 is disposed. In the embodiment shown, the seal 356 has a C-shaped cross section facing axially outward and is manufactured from a resilient material such as rubber.

In the embodiment disclosed in FIG. 5, the second bearing section 360 is similar in configuration to the first bearing section 330. The second bearing section 360 shares the common outer ring 340 via the second outer race 372. The second bearing section 360 further includes a second inner ring 380 having a second inner race 382, also referred to as a bearing surface. The second inner ring 380 is coaxially disposed in the common outer ring 340. A second plurality of rolling elements 384 (e.g., needle rollers or balls) are disposed between the second outer race 372 and the second inner race 382. The plurality of rolling elements 384 are in rolling engagement with the second outer race 372 and the second inner race 382 so that the common outer ring 340 is rotatable relative to the second inner ring 380 about the first axis of rotation A.

The second bearing section 360 has a seal 386 extending radially between the common outer ring 340 and the second inner ring 380. The seal 386 is configured to retain a lubricant inside an annular cavity 389 formed between the common outer ring 340 and the second inner race 382 in which the second plurality of rolling elements 384. In the embodiment shown, the seal 386 has a C-shaped cross section facing axially outward and is manufactured from a resilient material such as rubber.

Although the cam follower 310 shown in FIG. 5 has the first bearing section 330 and second bearing section 360, the present invention is not limited in this regard and, as will be appreciated by a person of ordinary skill in the art, many different configurations may be employed. For example, the present invention may by practiced using a cam follower having a single row of balls bearings. Or, for example, the present invention may be practiced using a cam follower having a bearing wherein a two piece split outer ring defines a first outer race and a second outer race, and a single continuous inner ring defines a first inner raceway and a second inner raceway.

In the embodiment shown in FIG. 5 the common outer ring 340 and the inner rings 350, 380 comprise 52100 steel that is through hardened. The first plurality of rolling elements 354 and the second plurality of rolling elements 384 also comprise 52100 steel. In the embodiment shown, each of the rolling elements 354 and each of the rolling elements 384 are separated by a respective cage, as is commonly known in the art (not shown in the FIGS.). The cage comprises low carbon soft steel. It should be understood that the present invention is not limited to a cage, as different spacers, or no spacers, may be employed between the balls in the first plurality of rolling elements 354 and the second plurality of rolling elements 384. It should also be understood that the present invention is not limited to rolling elements, as lubricious liners may be employed. Although specific materials are disclosed herein, a person of ordinary skill in the art and familiar with this disclosure will understand that the present invention is not limited in this regard, and that other materials may be used with the present invention.

In reference to FIG. 5, the first inner ring 350 comprises a first bore 351 extending therethrough, and the second inner ring 380 comprises a second bore 381 extending therethrough. A shaft 390 is received through the first bore 351 and the second bore 381. In the embodiment shown in FIG. 5, the shaft 390 is press-fit in the first bore 351 and the second bore 381 so that the first inner ring 350 and the second inner ring 380 are axially fixed relative to the shaft 390 about the first axis of rotation A. The shaft 390, also referred to as a stud, extends between a first end 391 and a second end 396. The first bearing section 330 and the second bearing section 360 are received on the shaft 390 proximate to the first end 391 thereof. The shaft 390 has a shoulder 392 projecting radially from the shaft 390 at a position between the first end 391 and the second end 396. After the second bearing section 360 is received on the shaft 390 the second inner ring 380 abuts the shoulder 392 to inhibit axial movement of the first and second bearing sections 330 and 350 relative to the shaft 390. After the first and second bearing sections 330 and 350 are disposed on the shaft 390 and the second inner ring 380 abuts the shoulder 392, a retainer ring 393 (e.g., snap ring) is removably secured in a groove 393G on the shaft 390 proximate to the first end 391 so the first bearing section 330 and the second bearing section 350 are disposed axially between the retainer ring 393 and the shoulder 392 to thereby inhibit axial movement thereof relative to the shaft 390.

The shaft 390 includes a face at the first end 391 perpendicular to the first axis of rotation A. The face is similar to the face 94 shown in FIG. 2 and includes a recessed hexagonal socket similar to the hexagonal socket 95 shown in FIG. 2. The shaft 390 further includes a plurality of threads 397 on a radial outside surface of the shaft 390. In this way, the shaft 390 can be received in a bore (e.g., such as the bore 269A or 269B illustrated in FIG. 4) comprising a complementary thread pattern, or can similarly be received in a nut or the like having a complementary thread pattern.

Figure 8:
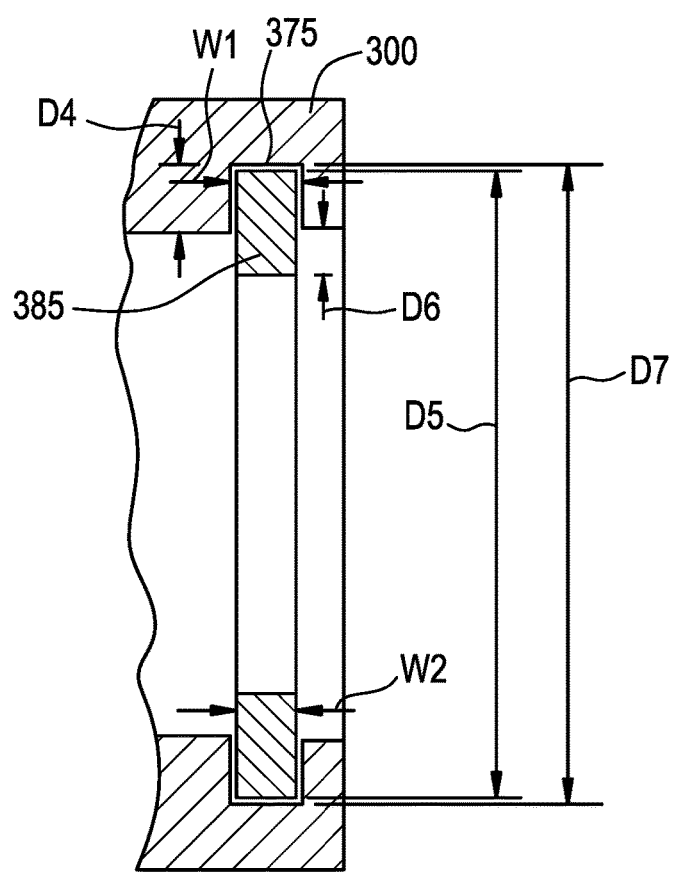
FIG. 8 is an enlarged view of the groove and retaining ring portion of the cam follower of FIG. 5.

The first bearing section 330 and the second bearing section 360 are received in a tire 300. The tire 300 has an outside surface 310. The outside surface 310 engages the cam (e.g., cam 260 shown in FIG. 4) during operating of the necker in accordance with the present invention. The tire 300 has an inner surface 398 extending from a shoulder 355 which extends radially inward proximate a first end 355A of the tire 300. The tire 300 has a radially outwardly extending groove 375 formed therein proximate a second axial end 375A of the tire 300. As best shown in FIG. 8, the groove 375 has a width W1 of about 0.030 inches to about 0.035 inches and a depth D4 of about 0.025 inches to about 0.035 inches. The groove 375 has an inside diameter D7 of 1.420 inches.

The tire 300 is interference fit over the exterior surface 344 of the common outer ring 340 so that the inner surface 398 frictionally engages the exterior surface 344. In particular, the exterior surface 344 has a roughness of 125 micro inches RMS minimum. A locking device or mechanism, for example, a retaining ring 385 is snap fit into the groove 375 so that a portion of the retaining ring 385 extends radially out of the groove 375, from the inner surface 398 by a distance D6, as shown in FIG. 8. The tire 300 is secured axially on the common outer ring 340 so that one axial end 340A of the common outer ring 340 engages the shoulder 355 and a second axial end 340B of the common outer ring 340 engages the portion of the retaining ring 375 that extends radially out of the groove 375.

The retaining ring 385 has a thickness W2 and an outside diameter D5. The inventors have conducted significant testing and experimentation to arrive at a suitable dimensional relationship between the size of the groove 375, including the width W1 the depth D4 and the inside diameter D7 and the size of the retaining ring 385 including the width W2, the outside diameter D5 and the distance D6 which the retaining ring extends from the inner surface 398, so that the retaining ring 385 does not wear into and degrade the tire 300. In particular, the inventors have found that the following dimensional relationship is preferable for minimizing such wear: In one embodiment the retaining ring 385 has a radially split 385A therein, as shown in FIG. 7.

The tire 300 is a composite material such as but not limited to an acetal homopolymer, for example Dekin® manufactured by E. I. du Pont de Nemours and Company. The acetal homopolymer is made from a highly-crystalline polymer that has high stiffness and strength compared to copolymers. For example, homopolymers have a tensile strength of 690 kgf/cm$^2$ while copolymers have a tensile strength of 610 kgf/cm$^2$. As used herein, synthetic high polymers have structure which consists of repeated monomer units connected each other with chemical bonds and a monomer is a unit component for forming a high polymer.

If a polymer consists of only one kind of monomer then it is referred to herein as a homopolymer, while a polymer which consists of more than one kind of monomer it is referred to herein as a copolymer. In addition, the inventors have selected homopolymers for a material for the tire 300 because homopolymers have a higher melting point (i.e., 178° C.) compared to copolymers (i.e., 167° C.). Due to the heat generated by rolling and rolling friction, a homopolymer was chosen because it has better thermal and oxidative stability than a copolymer. Additionally, long term fatigue resistance, creep resistance, bearing properties and chemical resistance are improved via the use of a homopolymer in the stead of a copolymer.

The present invention includes a method for installing the tire 300 on the common outer ring 340. The method includes roughening, for example, sandblasting the exterior surface 344 of the common outer ring 340 with 20 grit Aluminum Oxide and at a pressure of 90 psi to obtain a surface roughness of 125 micro inches RMS minimum.

Figure 6A:
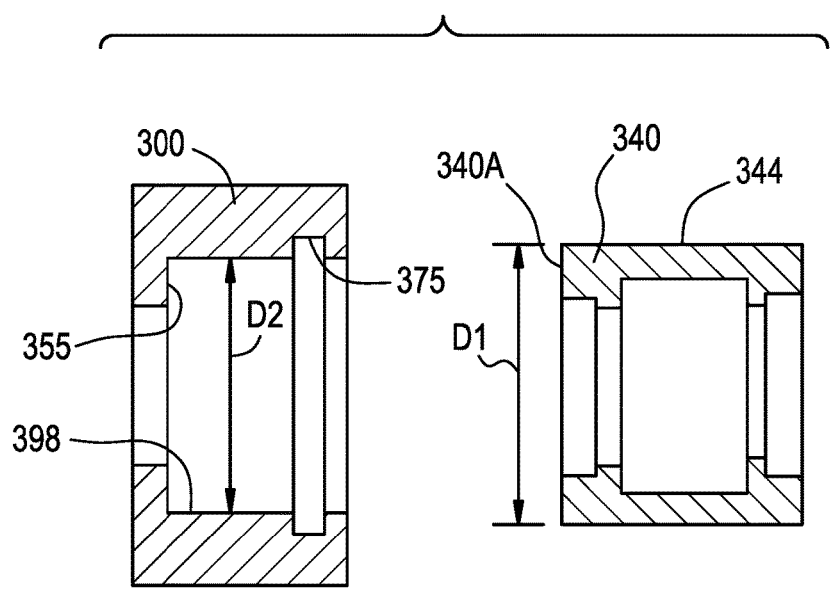
FIG. 6A is a cross sectional view of the outer ring and the tire shown in an as manufactured state prior to assembly.
Figure 6B:
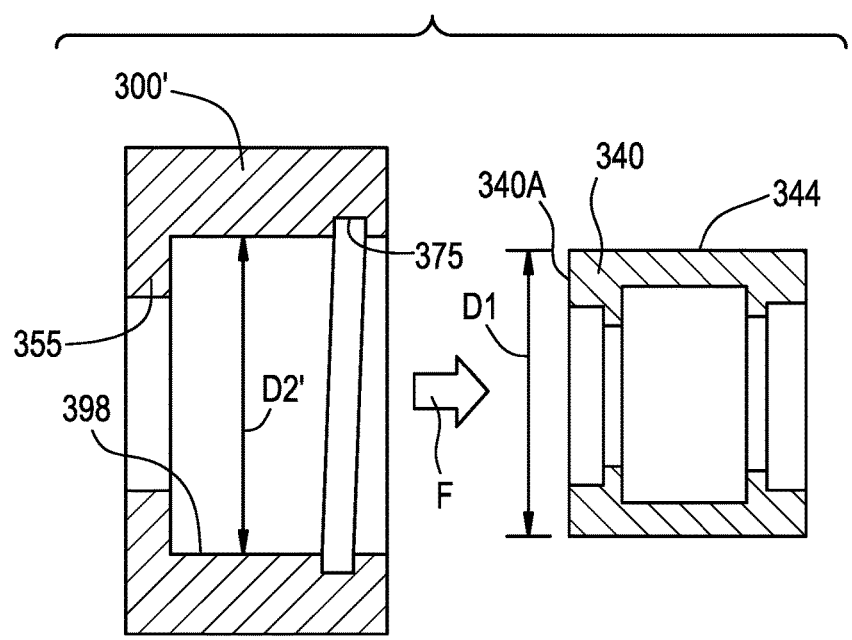
FIG. 6B is a cross sectional view of the outer ring in an as manufactured state and the tire shown in an as heated state prior to assembly.

Referring to FIGS. 6A and 6B, the common outer ring 340 has an outside diameter D1 and the tire 300 has an inside diameter D2 having a magnitude less than the outside diameter D1. The tire 300 is heated (as shown in FIG. 6B and designated by 300') to a temperature sufficient to increase the inside diameter to a magnitude D2' (FIG. 6B) greater than the outside diameter D2. The heated tire 300' is fit over the common outer ring 340 in the direction indicated by the arrow F so that the shoulder 355 abuts the axial end 340A. The tire 300 is cooled while positioned on the common outer ring 340 to affect the interference fit of about 0.013 to 0.014 inches. The retaining ring 385 is positioned in the groove 375 to axially secure the tire 300 to the common inner ring 340. In one embodiment, the exterior surface 310 of the tire 300 is machined to be concentric with the axis A and to achieve a predetermined outside diameter D as shown in FIG. 5.

Figure 9:
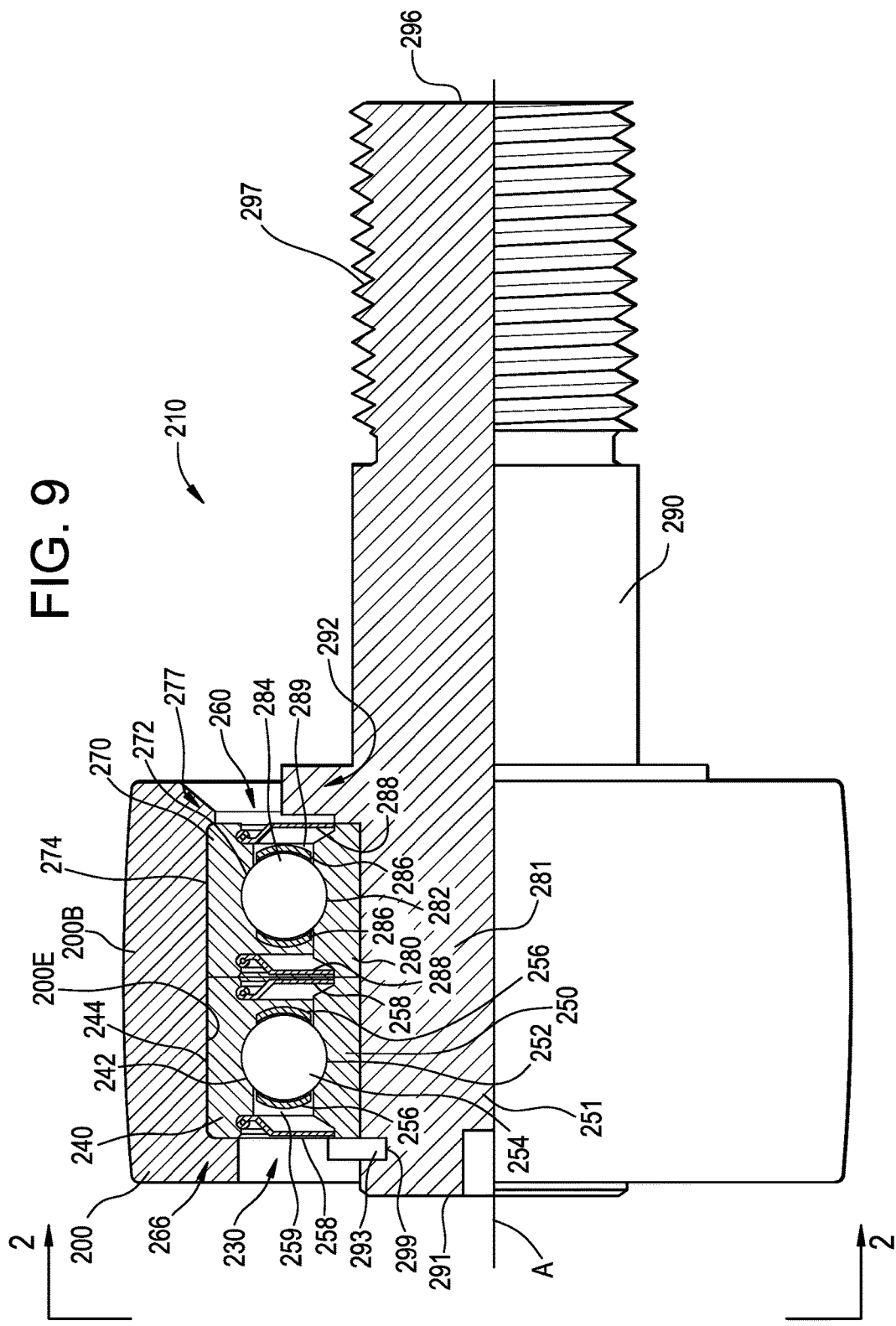
FIG. 9 is partial cross sectional view of a cam follower in accordance with another embodiment of the present invention.
Figure 10:
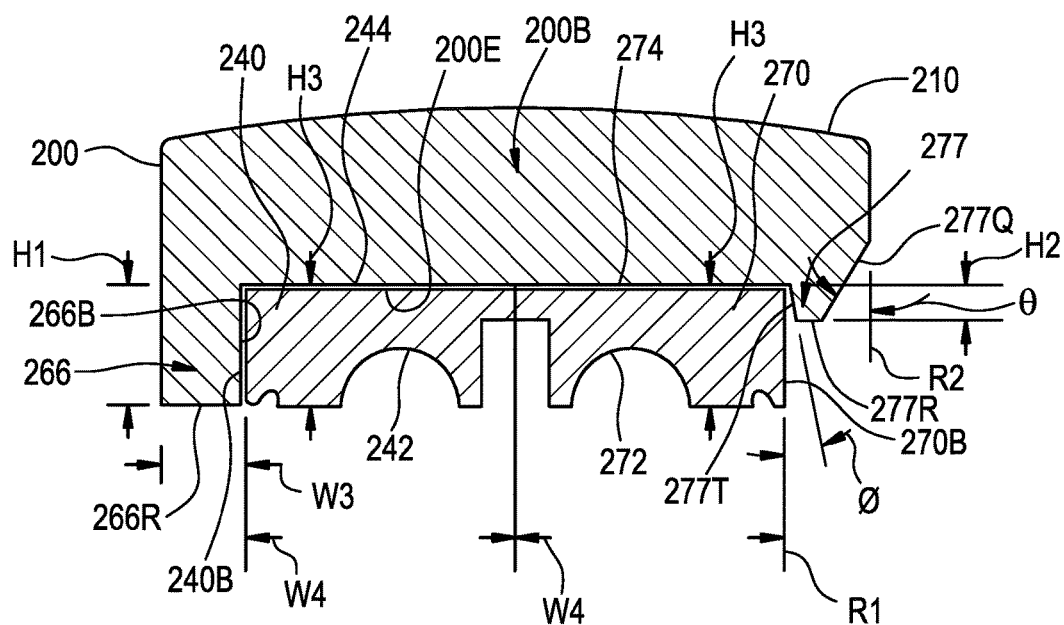
FIG. 10 is an enlarged view of a portion of the bearing outer ring and tire of FIG. 9.

As shown in FIGS. 2, 9-10, a cam follower for a ram of a necker machine is shown and is generally designated by the reference numeral 210. The cam follower 210 is similar to the cam follower 10 of FIG. 1, thus similar elements are designated with similar reference characters preceded by the numeral 2. The cam follower 210 includes a first bearing 230 (e.g., a roller or ball bearing) and a second bearing 260 (e.g., a roller or ball bearing). The first bearing 230 and the second bearing 260 are configured in a tandem configuration; that is, they are side to side. In the embodiment shown, the first bearing 230 and the second bearing 260 abut each other and are coaxial about a first axis of rotation A.

The first bearing 230 comprises a first outer ring 240 having a first outer race 242, also referred to as a bearing surface, and a first exterior surface 244. The first outer ring 240 has an axial width W4 as shown in FIG. 10. The first bearing 230 further includes a first inner ring 250 having a first inner race 252, also referred to as a bearing surface. The first inner ring 250 is coaxially disposed in the first outer ring 240. A plurality of balls 254 are disposed between the first outer race 242 and the first inner race 252. The plurality of balls 254 are in rolling engagement with the first outer race 242 and the first inner race 252 so that the first outer ring 240 is rotatable relative to the first inner ring 250 about the first axis of rotation A.

The first bearing 230 comprises an interior set of seals 256 extending radially between the first outer ring 242 and the first inner ring 252 on either side of the first plurality of balls 254. The first bearing 230 further comprises an exterior set of seals 258 extending radially between the first outer ring 240 and the first inner ring 250 axially outside of the interior set of seals 256. The interior and exterior seals 256, 258 are configured to retain a lubricant inside an annular cavity 259 formed between the first outer race 242 and the first inner race 252 in which the first plurality of balls 254 is disposed. In the embodiment shown, the seals 256, 258 comprise a low carbon steel, however, as can be appreciated by a person having ordinary skill in the art and familiar with this disclosure, the seals 256, 258, also referred to a shields, can comprise many different materials, including but not limited to plastic, polymer and composite materials.

In the embodiment disclosed in FIG. 9, the second bearing 260 is similar in configuration to the first bearing 230. The second bearing 260 comprises a second outer ring 270 having a second outer race 272, also referred to as a bearing surface, and a second exterior surface 274. The second outer ring 270 has an axial width W4 as shown in FIG. 10. The second bearing 270 further includes a second inner ring 280 having a second inner race 282, also referred to as a bearing surface. The second inner ring 280 is coaxially disposed in the second outer ring 270. A second plurality of balls 284 are disposed between the second outer race 272 and the second inner race 282. The plurality of balls 284 are in rolling engagement with the second outer race 272 and the second inner race 282 so that the second outer ring 270 is rotatable relative to the second inner ring 280 about the first axis of rotation A.

The second ball bearing 260 comprises an interior set of seals 286 extending radially between the second outer ring 272 and the second inner ring 282 on either side of the second plurality of balls 284. The second bearing 260 further comprises an exterior set of seals 268 extending radially between the second outer ring 272 and the second inner ring 282 axially outside of the interior set of seals 286. The seals 286, 288 are configured to retain a lubricant inside an annular cavity 289 formed between the second outer race 272 and the second inner race 282 in which the second plurality of balls 284 are disposed. In the embodiment shown, the seals 286, 288 comprise a low carbon steel, however, as can be appreciated by a person having ordinary skill in the art and being familiar with this disclosure, the seals 286, 288, also referred to a shields, can comprise many different materials, including but not limited to plastic, polymer and composite materials.

In reference to the embodiment shown in FIGS. 2 and 9, although the cam follower 210 comprises a first bearing 230 and a second bearing 260, the present invention is not limited in this regard and, as will be appreciated by a person of ordinary skill in the art, many different configurations may be employed. For example, the present invention may be practiced using a cam follower having a single row of bearings. Or, for example, the present invention may be practiced using a cam follower having a bearing wherein a single continuous outer ring defines a first outer race and a second outer race, and a single continuous inner ring defines a first inner raceway and a second inner raceway.

In the embodiment shown in FIGS. 2 and 9, the outer rings 240, 270 and the inner rings 250, 280 comprise 52100 steel that is through hardened. The first plurality of balls 254 and the second plurality of balls 284 also comprise 52100 steel. In the embodiment shown, the balls 254, 284 are separated by a cage, as is commonly known in the art (not shown in the FIG.). The cage comprises low carbon soft steel. It should be understood that the present invention is not limited to a cage, since different spacers, or no spacers, may be employed between the balls in the first plurality of balls 254 and the second plurality of balls 284. It should also be understood that the present invention is not limited to balls, since other types of rolling elements may be employed with the present invention, for example, needle rollers.

Although specific materials are disclosed herein, a person of ordinary skill in the art and familiar with this disclosure will understand that the present invention is not limited in this regard, and that other materials may be used with the present invention.

In reference to FIGS. 2 and 9, the first inner ring 250 comprises a first bore 251 extending therethrough, and the second inner ring 280 comprises a second bore 281 extending therethrough. A shaft 290 is received through the first bore 251 and the second bore 281. In the embodiment shown in FIGS. 2 and 9, the shaft 290 is press-fit in the first bore 251 and the second bore 281 so that the first inner ring 250 and the second inner ring 280 are fixed relative to the shaft about the first axis of rotation A. The shaft 290, also referred to as a stud, extends between a first end 291 and a second end 296. The first bearing 230 and the second bearing 260 are received on the shaft 290 proximate to the first end 291 thereof. The shaft comprises a shoulder 292 projecting radially from the shaft between the first end 291 and the second end 296. After the second bearing 260 is received on the shaft 290 the second inner ring 280 abuts the shoulder 292 to inhibit axial movement of the bearings 230, 260 relative to the shaft 290. After the bearings 230, 260 are disposed on the shaft 290 and the second inner ring abuts the shoulder 292, a retainer ring 293 is fixedly received on the shaft 290 in a groove 299 proximate to the first end 291 so the first bearing 230 and the second bearing 260 are disposed axially between the retainer ring 293 and the shoulder 292 to thereby inhibit axial movement of the bearings relative to the shaft 290.

The shaft 290 includes a face 294 at the first end 91 perpendicular to the first axis of rotation A. The face 294 comprises a recessed hexagonal socket 295 configured to receive a hex wrench (or the like) for rotating the shaft 290 about the first axis of rotation A. The shaft 290 further includes a plurality of threads 297 on a radial outside surface of the shaft 290. In this way, the shaft 290 can be received in a bore (not shown in the FIGS. 2 and 9) comprising a complementary thread pattern, or can similarly be received in a nut or the like having a complementary thread pattern.

The first bearing 230 and the second bearing 260 are received in a tire 200 (e.g., an annular tire). The tire 200 has an outside surface 210. The outside surface 210 is crowned (e.g., is arcuate) and engages the cam (not shown in FIGS. 2 and 9) during operating of the necker in accordance with the present invention. The first exterior surface 244 and the second exterior surface 274 are substantially cylindrical and define a first diameter D1 as shown on FIG. 2. The tire 200 has radially inward facing surface 200E that is cylindrical (e.g., uniform) and defines a second diameter D2 as shown in FIG. 2. The first diameter D1 is greater than the second diameter D2 so that the tire 200 is expanded over the first exterior surface 244 and the second exterior surface 274. Thus, the tire 200 is press fit over the first exterior surface 244 and the second exterior surface 274 and radially compresses against the first exterior surface 244 and the second exterior surface 274 to prevent axial movement of the first outer ring 240 and the second outer ring 270 relative to the tire 200.

Figure 11:
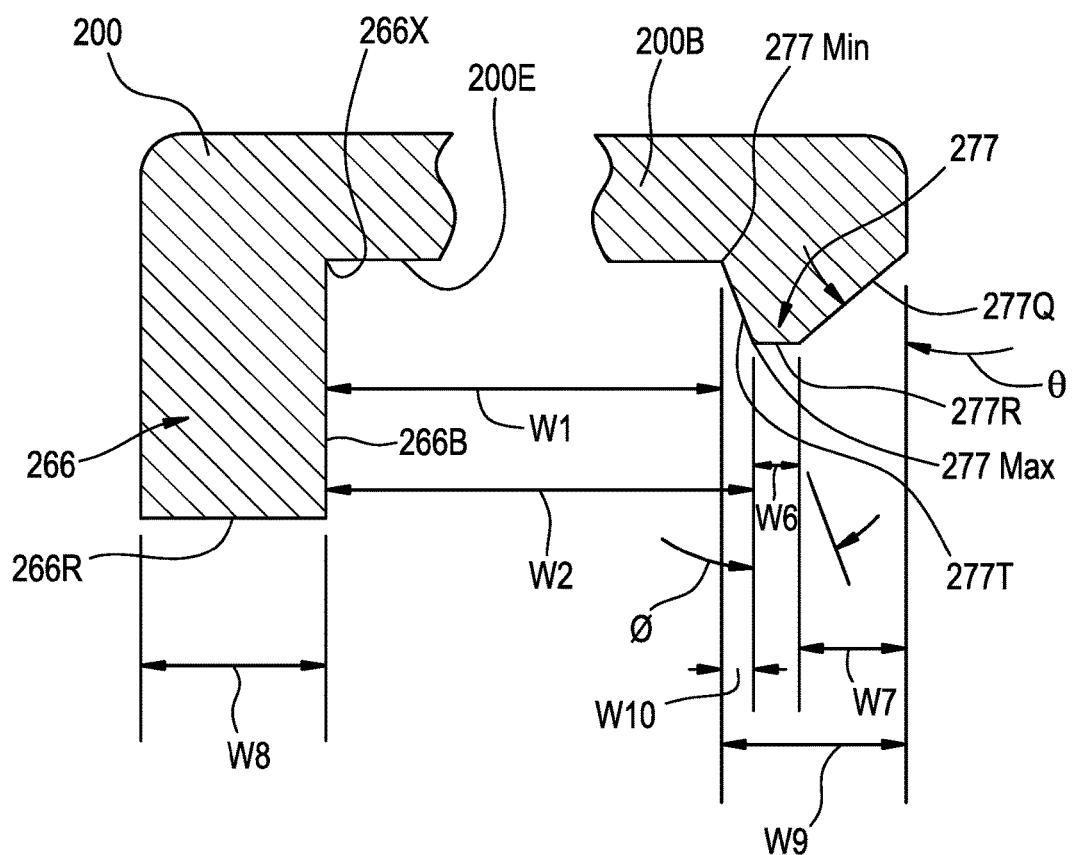
FIG. 11 is an enlarged and segmented view of a portion of the tire of FIG. 10.

As shown in FIGS. 9-11, the tire 200 includes an elongate body portion 200B that extends between a first radially inward projecting shoulder 266 and a second radially inward projecting shoulder 277 proximate to opposing axial ends of the tire 200 (e.g., each adjoining the respective on of the opposing axial ends of the tire 200). The radially inward facing surface 200E extends between the first radially inward projecting shoulder 266 and the second radially inward projecting shoulder 277. In one embodiment, the tire is manufactured from thermoplastic material. In one embodiment, thermoplastic material is an acetal homopolymer material. In one embodiment, the tire 200 is manufactured from a composite material. In one embodiment, the composite material is an acetal homopolymer. In one embodiment, the tire 200 is manufactured from a nylon material.

The first radially inward projecting shoulder 266 extends a first length H1 radially inward from the radially inward facing surface 200E to a radial edge 266R. In one embodiment, the first length H1 is about equal to an annular thickness H3 of the outer ring 240 and the outer ring 270. The first radially inward projecting shoulder 266 has an axially inwardly facing abutment surface 266B that abuts an axial end 240B of the first outer ring 240. As shown in FIG. 11, the first radially projecting shoulder 266 has an axial width W8.

As best shown in FIG. 10, the second shoulder 277 extends and slopes a second length H2 radially inward and axially outward from the radially inward facing surface 200E to a radially inward facing surface 277R. As shown in FIG. 11, the radially inner edge 277R has an axial width W6 and the second radially projecting shoulder 277 has an overall axial width W9.

In one embodiment, the second length H2 is about less than the annular thickness H3 of the outer ring 240 and the outer ring 270 and less than the first length H1. In one embodiment, the second length H2 is less than about 25 percent of the first length H1. In one embodiment, the second length H2 is less than about 15 percent of the first length H1. In one embodiment, the second length H2 is less than about 5 percent of the first length H1.

In one embodiment, the second length H2 is less than about 25 percent of the annular thickness H3. In one embodiment, the second length H2 is less than about 15 percent of the annular thickness H3. In one embodiment, the second length H2 is less than about 5 percent of the annular thickness H3.

The second radially inward projecting shoulder 277 has an inwardly facing sloped abutment surface 277T. A portion of the inwardly facing sloped abutment surface 277T abuts a portion of an axial end 270B of the second outer ring 240. The inwardly facing sloped abutment surface 277T is sloped at an angle Ø measured away from (e.g., axially outwardly away) a radial line R1. In one embodiment, the angle Ø is between 0.5 and 1.5 degrees. In one embodiment, the angle Ø is between 0.8 and 1.2 degrees. In one embodiment, the angle Ø is between 0.9 and 1.1 degrees. In one embodiment, the angle Ø is between 1.9 and 2.0 degrees. In one embodiment, the angle Ø is between 0.5 and 2.5 degrees. In one embodiment, the angle Ø is less than 5 degrees. The inwardly facing sloped abutment surface 277T has an axial width W10.

The second shoulder 277 has an outwardly facing sloped relief surface 277Q that is sloped at an angle θ measured away from (e.g., axially inwardly away) a radial line R2. In one embodiment, the angle θ is between about 40 and 50 degrees. In one embodiment, the angle θ is between about 50 and 60 degrees. In one embodiment, the angle θ is between about 30 and 40 degrees. In one embodiment, the angle θ is between about 30 and 60 degrees. As shown in FIG. 11, the outwardly facing sloped relief surface 277Q has an axial width W7.

As shown in FIG. 11, the radially inward facing surface 200E has a first width W1 measured between: 1) a first junction 266X of the axially inward facing abutment surface 266B and the radially inward facing surface 200E; and 2) a second junction 277Min between the inwardly facing sloped abutment surface 277T and the radially inward facing surface 200E. The tire 200 defines a second width W2 measured between: 1) the axially inward facing abutment surface 266B; and 2) a third junction 277Max between the inwardly facing sloped abutment surface 277T and the radially inner edge 277R.

The inventors have surprisingly discovered that the inwardly facing sloped abutment surface 277T has utility in reducing or eliminating axial movement of the first outer ring 240 and the second outer ring 270 relative to the tire 200 by a compensating feature for stack-up tolerances. When the sum of the axial widths W4 of the first outer ring 240 and the second outer ring 270 is less than the width W2, the first outer ring 240 and the second outer ring 270 will still engage a portion of the inwardly facing sloped abutment surface 277T and axially compress the first outer ring 240 and the second outer ring 270 between the inwardly facing sloped abutment surface 277T and the axially inwardly facing abutment surface 266B. Thus, the inwardly facing sloped abutment surface 277T accommodates undersized combined widths W4 of the first outer ring 240 and the second outer ring 270, of about the axial width W10 of the inwardly facing sloped abutment surface 277T, as illustrated collectively in FIGS. 10 and 11.

The inventors have also surprisingly discovered that the second radially inward projecting shoulder 277 has utility in the installation by press fitting of the first outer ring 240 and the second outer ring 270 into the tire 200. For example, the second length H2 is of a predetermined magnitude to allow radially outward deflection of the second radially inward projecting shoulder 277 to allow the first outer ring 240 and the second outer ring 270 to be pressed axially into the tire 200 without the need for special tools. The outwardly facing sloped relief surface 277Q and the axial width W7 thereof are configured to facilitate entry of the first outer ring 240 and the second outer ring 270 into the tire 200 and to provide sufficient support to maintain axial compression of the first outer ring 240 and the second outer ring 270 between the inwardly facing sloped abutment surface 277T and the axially inwardly facing abutment surface 266B.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A bearing assembly for a cam follower assembly for a ram assembly for a metal can production necker, the bearing assembly comprising:

at least two bearings, each bearing comprising:

an inner ring positioned within an outer ring; and a plurality of rolling elements positioned therebetween;

a tire press fit on the outer rings of the at least two bearings, the tire comprising an elongate body portion that extends between a first radially inward projecting shoulder and a second radially inward projecting shoulder, a radially inward facing surface extending between the first radially inward projecting shoulder and the second radially inward projecting shoulder, and the first radially inward projecting shoulder extending further radially inward than the second radially inward projecting shoulder, wherein the second radially inward projecting shoulder comprises a stack-up tolerance compensating feature consisting of an inwardly facing sloped abutment surface, the inwardly facing sloped abutment surface extends continuously from a first junction between the radially inward facing surface and the inwardly facing sloped abutment surface to a second junction between the inward facing surface and a first radially inner edge of the second radially inward projecting shoulder, such that the stack-up tolerance compensating feature configures the tire press fit on the outer rings to engage a portion of the inwardly facing sloped abutment surface and axially compress the outer rings between the inwardly facing sloped abutment surface and the axially inwardly facing abutment surface when the sum of the axial widths of the outer rings is greater than the axial width between the inwardly facing sloped abutment surface and the axially inwardly facing abutment surface.

2. The bearing assembly of claim 1, wherein the inwardly facing sloped abutment surface is defined by a first angle measured axially outwardly away from a radial line perpendicular to a longitudinal axis of the bearing assembly.

3. The bearing assembly of claim 2, wherein the first angle is less than 5 degrees.

4. The bearing assembly of claim 1, wherein the outer rings of the at least two bearings are axially compressed between the first radially inward projecting shoulder and the second radially inward projecting shoulder.

5. The bearing assembly of claim 1, wherein the second radially inward projecting shoulder comprises an outwardly facing sloped relief surface.

6. The bearing assembly of claim 1, wherein the second radially inward projecting shoulder defines a second radially inner edge that has a length less than an annular thickness of the outer rings.

7. The bearing assembly of claim 1, wherein the tire is manufactured from a thermoplastic material.

8. The bearing assembly of claim 7, wherein the thermoplastic material is an acetal homopolymer.

9. The bearing assembly of claim 1, wherein the tire is manufactured from a nylon material.

10. The bearing assembly of claim 1, wherein the first radially inward projecting shoulder and the second radially inward projecting shoulder each extending radially inward over an axial side of the outer rings.

* * * * *